United States Patent [19]

Håkansson

[11] 4,179,376

[45] Dec. 18, 1979

[54] DEVICE FOR PURIFICATION OF LIQUIDS

[76] Inventor: Lars Å. H. Håkansson, Lindöhällsvägen 15, S-603 65 Norrköping, Sweden

[21] Appl. No.: 877,749

[22] Filed: Feb. 14, 1978

[30] Foreign Application Priority Data

Feb. 16, 1977 [SE] Sweden ............................ 7701734

[51] Int. Cl.² .................... C02B 1/20; C02C 1/34
[52] U.S. Cl. ................................ 210/208; 210/220; 210/242 R; 210/391; 210/521
[58] Field of Search ............... 210/150, 151, 207, 208, 210/209, 219, 220, 242 R, 521, 522, 391, 409

[56] References Cited

U.S. PATENT DOCUMENTS

| 1,718,871 | 6/1929 | Nordell | 210/522 X |
| 2,483,706 | 10/1949 | Lind | 210/207 |
| 3,067,878 | 12/1962 | Genter et al. | 210/521 X |
| 3,613,889 | 10/1971 | Reed | 210/522 X |
| 3,615,025 | 10/1971 | Rice et al. | 210/208 X |
| 3,635,346 | 1/1972 | Zuckerman et al. | 210/208 |
| 4,042,512 | 8/1977 | McCarthy et al. | 210/521 X |
| 4,045,344 | 8/1977 | Yokota | 210/151 X |

FOREIGN PATENT DOCUMENTS

| 2340584 | 2/1975 | Fed. Rep. of Germany | 210/150 |
| 45830 | 6/1972 | Finland | 210/151 |
| 1516848 | 3/1968 | France | 210/209 |
| 2166129 | 8/1973 | France | 210/151 |
| 349554 | 10/1972 | Sweden | 210/150 |

*Primary Examiner*—Robert H. Spitzer
*Attorney, Agent, or Firm*—Oldham, Oldham, Hudak & Weber Co.

[57] ABSTRACT

Device for purification of liquids, especially waste water from industrial processes, and including a flocculation chamber having means for supply of a flocculant, a precipitation or sedimentation chamber for separation of the precipitate and a filter unit for further purification of the liquid from the precipitation or sedimentation chamber. In the device the filter unit is arranged as an annular filter array having substantially radially arranged, inclined lamellas, said filter array being slidably and rotatably arranged on a vertical outlet tube in the precipitation or sedimentation chamber and being provided with a float member, which keeps the filter array in predetermined height relative to the surface of the liquid in the precipitation or sedimentation chamber. The flocculation chamber comprises an annular, upwardly open channel, which is arranged around the filter array in the precipitation or sedimentation chamber. A cylindrical casing having apertures is arranged between the filter array and the annular flocculation chamber said casing being arranged to slowly rotate around the outlet tube and being provided with driving means, so that the filter array follows the casing in its rotational movement.

8 Claims, 1 Drawing Figure

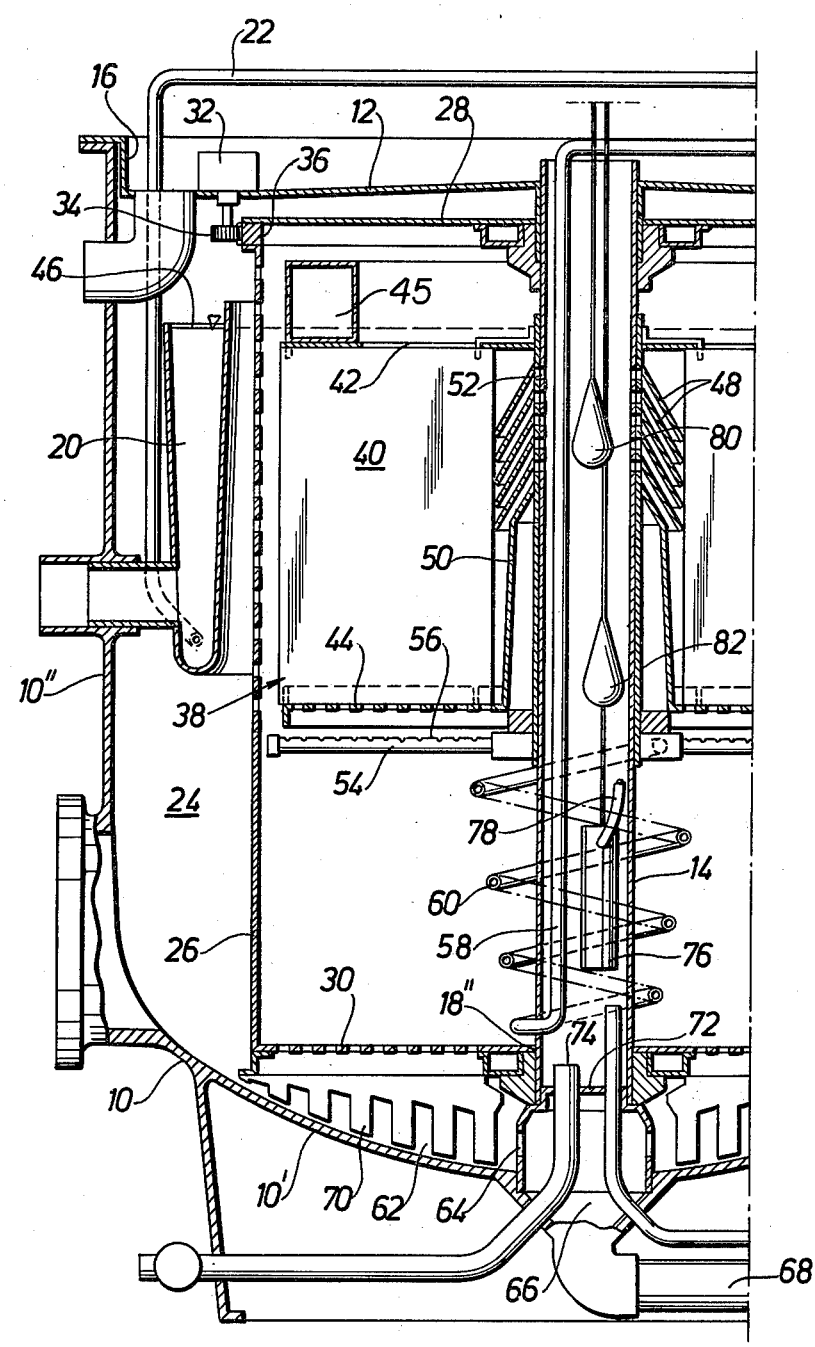

DEVICE FOR PURIFICATION OF LIQUIDS

The present invention relates to a device for purification of liquids, especially waste water from industrial processes, and including a flocculation chamber having means for supply of a flocculant, a precipitation or sedimentation chamber for separation of the precipitate and a filter unit for further purification of the liquid from the precipitation or sedimentation chamber.

Up to now it has been necessary in the purification of liquids, e.g. from industrial processes, to use devices having very large volume, i.e. precipitation or sedimentation chambers where the liquid is mixed with chemical substances reacting with dissolved substances in the liquid to form undissolvable substances, which sedimentate as sludge on the bottom of the chamber, and filter chambers having relatively large dimensions in order to further purify the treated liquid. This purification of the liquid or waste water has in many cases to be done at the industry where the liquid is generated, since the liquid cannot be discharged into the municipal sewage system due to environmental problems. There is, therefore, a need for smaller and more compact devices for purification of liquids, especially waste waters from industrial processes, but up to now it has not been possible to provide such a device with the necessary capacity and the necessary purification ability, because it has been necessary in a smaller device to use relatively high flow velocity in the liquid.

The object of the present invention is to provide a device for purification of liquids, especially waste water from industrial processes, which device removes the above mentioned disadvantages and is relatively compact and simple in construction and has very good purification ability. According to the invention this is achieved in a device of the initially mentioned art, which primarily is characterized in that the filter unit is arranged as an annular filter array having substantially radially arranged, inclined lamellas, said filter array being slidably and rotatably arranged on a vertical outlet tube in the precipitation or sedimentation chamber and is provided with a float member, which keeps the filter array in predetermined height relative to the surface of the liquid in the precipitation or sedimention chamber, that the flocculation chamber comprises an annular, upwardly open channel, which is arranged around the filter array in the precipitation or sedimentation chamber, and in that a cylindrical casing having apertures is arranged between the filter array and the annular flocculation chamber, said casing being arranged to slowly rotate around the outlet tube and being provided with driving means, so that the filter array follows the casing in its rotational movement.

The invention is described in more detail below in conjunction with the attached drawing, which shows a vertical section through a device according to one embodiment of the invention, a portion of the right hand half of the device being cut away.

In the drawing is shown a device for purification of liquids, said device being primarily intended for purification of waste liquids from industrial processes, and the device is contained in an outer container 10 having a convex or conical bottom portion 10' and a substantially cylindrical main portion 10" having a vertical axis. The container 10 is at its upper end provided with center supports 12, and a central or outlet tube 14 is arranged coaxially with the axis of the container, said central tube being attached to the bottom of the container and in its upper portion supported by the center supports 12, which by means of a flange 16 is supported against the cylindrical main portion 10' of the container 10. The container 10 is provided with an inlet opening 18 for the liquid, and the inlet opening 18 opens into an annular flocculation chamber 20, which is arranged at some distance from the inside of the wall of the container 10. In the flocculation chamber 20 a flocculant is added through a conduit 22, and the liquid gets a circulating movement in the annular flocculation chamber 20, which provides good mixing between liquid and flocculant. The flocculation effect is further increased by contact with old sludge at the bottom of the flocculation chamber 20. From the flocculation chamber 20 the liquid is overflowed into the container 10, which constitutes a precipitation or sedimentation chamber 24, where the precipitate from the flocculation chamber can sink towards the bottom, and it is advantageous if the container 10 has such volume, that the flow velocity of the liquid in the precipitation or sedimentation chamber 24 is between 0.1 and 0.2 m/s, so that the precipitate is not destroyed and an optimum of sedimentation velocity is obtained. From the precipitation or sedimentation chamber 24 the liquid passes through an at least partially perforated, cylindrical casing 26, which is concentric with the axis of the container 10 and is rotatably mounted on the central tube 14. The perforated casing 26 has also an upper wall 28 and a lower wall 30, which also is perforated. The casing 26 is driven by a driving means 32 having a gear wheel 34, which engages a gear ring 36 on the casing.

Within the casing 26 a filter unit in the form of an annular filter array 38 is arranged. The filter array 38 includes a great number of substantially radially arranged lamellas 40, which are arranged between an upper plate 42 and a lower plate 44, said plates being rotatably and slidably mounted on the central tube 14. The lamellas 40 are arranged substantially radially and are inclined relative to a horizontal plane, the inclination being at least 60° at the periphery and between 60 and 80° at the portions closest to the central tube 14. The upper plate 42 supports an annular float member 45, which is intended to keep the filter array 38 at a predetermined height relative to the surface 46 of the liquid in the container 10. It is preferred that the float member 45 has such buoyancy, that its upper portion is positioned somewhat above the surface 46 of the liquid, so that any impurities floating on the surface are prevented from flowing towards the central tube 14. The filter array 38 is rotated together with the cylindrical casing 26 by the driving means 32.

Radially inwardly of the filter array 38, i.e. between this and the central tube 14, a number of lamellas 48 shaped as truncated cones are arranged. The lamellas 48 rest against a conical tube 50 and are supported radially against the central tube 14, which is provided with openings 52, through which the space between the lamellas 48 communicates with the interior of the central tube 14. When using small flow velocities in the liquid and small distances between the lamellas 40 in the filter array 38 there is a risk that the filter array is blocked up, and to make it possible to clean the filter array there is below the same a cleaning device 54, which consists of a number of radially arranged tubes having spreader nozzles 56 for introducing air between the lamellas 40 in the filter array 38. The cleaning device 54 is supplied with air through a conduit 58 in the central tube 14, which conduit is connected to an elastic, helical conduit 60 which makes it possible for the cleaning device 54 to move upwardly and downwardly along the central tube 14. The cleaning device 54 is however, non-rotatable relative to the central tube 14.

Below the casing 26 the container 10 has a chamber 62 for collection of the precipitate sedimentating from the liquid. This precipitate passes through openings 64 into a lower portion 66 in the central tube 14 and can be discharged through an outlet tube 68. In order to thicken the precipitate and improve its movement out from the chamber 62 a number of scrapers 70 are arranged on the lower surface of the bottom 30 of the casing 26. The lower portions 66 of the central tube 14 is divided from the remaining portion of the central tube 14 by means of a partition wall 72. The purified water that is introduced into the central tube 14 through the openings 52 is discharged from the central tube through a bottom outlet 74 or is pumped out by means of a pump 76 and discharged through a tube 78.

The liquid to be purified in the device according to the invention is introduced through the inlet opening 18 and is in the flocculation chamber mixed together with a flocculant, so that impurities in the liquid are transformed to a precipitate having higher density than the liquid. As mentioned above, the shape of the flocculation chamber 20 gives a very good precipitation efficiency, and the liquid is then overflowed to the precipitation or sedimentation chamber 24, where the precipitate sinks down towards the bottom and into the chamber 62, where the sedimentated precipitate by means of the scrapers 70 can be discharged through the openings 64. The liquid in the precipitation or sedimentation chamber 24 has a flow velocity of between 0.1 and 0.2 m/s, which gives very good conditions for sedimentation. From the precipitation or sedimentation chamber the liquid is passed through the perforated casing 26, which separates any large-sized precipitate, to the filter array 38, which rotates together with the casing 26. In the filter array 38, the liquid flows radially through the spaces between the lamellas 40. The lamellas 40 are arranged very close to each other and are inclined, and it is further of advantage if the lamellas are corrugated, so that the liquid in the spaces between the lamellas has a turbulent movement, which means that in the liquid suspended flock and other particles is brought into contact with the lamellas and sink down towards the lower plate 44, which is perforated, so that the particles can sink further down into the chamber 62.

From the inner periphery of the filter array 38 the liquid is led into the spaces between the lamellas 48, where a further sedimentation of any remaining particles in the liquid takes place. This sedimentation is increased in that the space between the lamellas 48 is choosen in such a way that the flow through area is substantially greater than in the filter array 38, so that the flow velocity is decreased, which means that also very small particles can sedimentate and sink down towards the bottom. From the spaces between the lamellas 48 the liquid is led through the openings 52 into the central tube 14, from which it can be discharged as mentioned above. The supply of waste liquid to the device is controlled by means of two level sensing devices 80 and 82.

If the filter array 38 is blocked up it can be cleaned in that air is introduced by means of the cleaning device 54. While such a cleaning operation is performed no water ought to be taken out from the central tube 14, because the purity of the water during this time is unsatisfactory.

If the liquid contains oil or other substances having lower density than the liquid these impurities can be removed in the device according to the invention. These impurities rise towards the surface of the liquid, where they can be removed by means of a pump or in any other suitable way. The float member 44 thereby prevents the impurities on the liquid surface from flowing into the filter array 38 from above.

The filter array 38 according to the invention can also be used for biological purification, and in that case the filter array 38 is supplied with air by means of the cleaning device 54, whereby the air flow through the nozzles 56 is adjusted in such a way, that an optimum of biological action is obtained. After a certain time or when there is risk of blocking up, the lamellas 40 ought to be cleaned by a strong flow of air from the cleaning device 54, and during this operation no water ought to be taken out of the central tube 14.

The invention is not limited to the embodiment described above, but changes can be made within the scope of the appended claims.

I claim:

1. Device for purification of liquids, especially waste water from industrial processes, and including a flocculation chamber (20) having means (22) for supply of a flocculant, a precipitation or sedimentation chamber (24) for separation of the precipitate and a filter unit (38) for further purification of the liquid from the precipitation or sedimentation chamber (24), characterized in that the filter unit is arranged as an annular filter array (38) having substantially radially arranged, inclined lamellas (40), said filter array being slidably and rotatably arranged on a vertical outlet tube (14) in the precipitation or sedimentation chamber (24) and is provided with a float member 45, which keeps the filter array (38) in predetermined height relative to the surface of the liquid in the precipitation or sedimentation chamber (24), that the flocculation chamber (20) comprises an annular, upwardly open channel, which is arranged around the filter array (38) in the precipitation or sedimentation chamber (24), and in that a cylindrical casing (26) having apertures is arranged between the filter array (38) and the annular flocculation chamber (20), said casing being arranged to slowly rotate around the outlet tube (14) and being provided with the driving means, so that the filter array (38) follows the casing (26) in its rotational movement.

2. Device according to claim 1, characterized in that the lamellas (40) of the filter array (38) have an inclination angle of between 60° and 80° relative to a horizontal plane.

3. Device according to claim 1 or 2, characterized in that the lamellas (40) consist of corrugated sheets, the corrugations of which are arranged substantially at right angles to the flow direction of the liquid through the filter array (38).

4. Device according to claim 3, characterized in that a cleaning device (54) is arranged below the filter array (38), said cleaning device including at least one tube having a plurality of nozzles (56) for introducing a cleaning medium, preferably air, in the spaces between the lamellas (40) in the filter array (38).

5. A device for the purification of liquids, especially waste water from industrial processes, including a flocculation chamber having means for receiving a flocculant, a precipitation chamber for separation of the precipitate and a filter unit for further purification of the liquid from the precipitation chamber, characterized by the filter unit being arranged as an annular filter array having substantially radially arranged, inclined lamellas, said filter array being slidably and rotatably arranged on a vertical outlet tube in the precipitation chamber, said filter array having a float member thereon so that said filter array is maintained in a predetermined height relative to the surface of said liquid in said precipitation chamber, and a cylindrical casting having apertures arranged between said filter array and the flocculation chamber.

6. A device according to claim 5 further characterized in that said lamellas of said filter array have an inclination angle of between 60° and 80° relative to a horizontal plane.

7. A device according to claim 5, further characterized in that said lamellas consist of corrugated sheets, the corrugations of which are arranged substantially at right angles to the flow of the direction of liquid through said filter array.

8. A device according to claim 7, further characterized in that a cleaning device is arranged below said filter array, said cleaning device including at least one tube having a plurality of nozzles for introducing a cleaning medium, preferably air, in the spaces between the said lamellas in said filter array.

* * * * *